United States Patent
Kovach, II et al.

(10) Patent No.: US 7,471,649 B1
(45) Date of Patent: Dec. 30, 2008

(54) MODEL TRAIN WIRELESS BI-DIRECTIONAL COMMUNICATION PROTOCOL

(75) Inventors: Louis G. Kovach, II, Belleville, MI (US); Neil P. Young, Redwood City, CA (US); Howard William Lewis, Whitmore Lake, MI (US)

(73) Assignee: Liontech Trains LLC, Chesterfield, MI (US)

( * ) Notice: Subject to any disclaimer, the term of this patent is extended or adjusted under 35 U.S.C. 154(b) by 1211 days.

(21) Appl. No.: 10/723,260

(22) Filed: Nov. 25, 2003

(51) Int. Cl.
*H04B 7/005* (2006.01)
(52) U.S. Cl. ........................ 370/278; 370/282; 370/329; 370/338; 370/382; 370/395.4; 318/268
(58) Field of Classification Search ................. 370/278, 370/282, 328, 329, 337, 338, 382, 395.4, 370/395.5, 395.53; 318/268; 701/19; 714/752, 714/769, 775
See application file for complete search history.

(56) References Cited

U.S. PATENT DOCUMENTS 5,280,629 A * 1/1994 Lo Galbo et al. ............ 455/503
6,292,470 B1 * 9/2001 Uota ........................... 370/252
2005/0285552 A1 * 12/2005 Grubba et al. .............. 318/268

* cited by examiner

*Primary Examiner*—Matthew D. Anderson
*Assistant Examiner*—Shaima Q Aminzay
(74) *Attorney, Agent, or Firm*—O'Melveny & Myers LLP

(57) ABSTRACT

Methods and apparatuses implement a bi-directional model train communications protocol compatible with existing uni-directional communications protocols. In one specific embodiment, the existing uni-directional Lionel Train Master command set is expanded utilizing the checksum error nibble to flag an alternative command signal format. This expanded command set is in turn utilized to transmit a command inquiry signal from the base unit to a specifically addressed element. The addressed element in turn transmits a response based upon the expanded command set. Older model railroad elements not configured to recognize the expanded command set, regard the command inquiry signal as a transmission error and are unaffected. Newer model railroad elements not specifically addressed by the command inquiry signal ignore the command and continue operation.

19 Claims, 5 Drawing Sheets

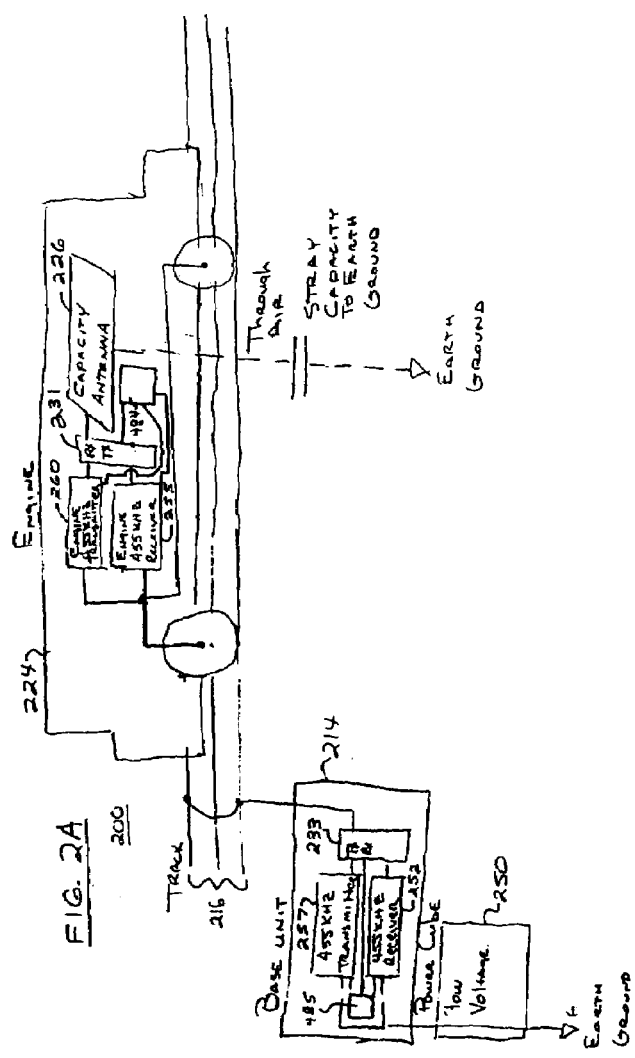
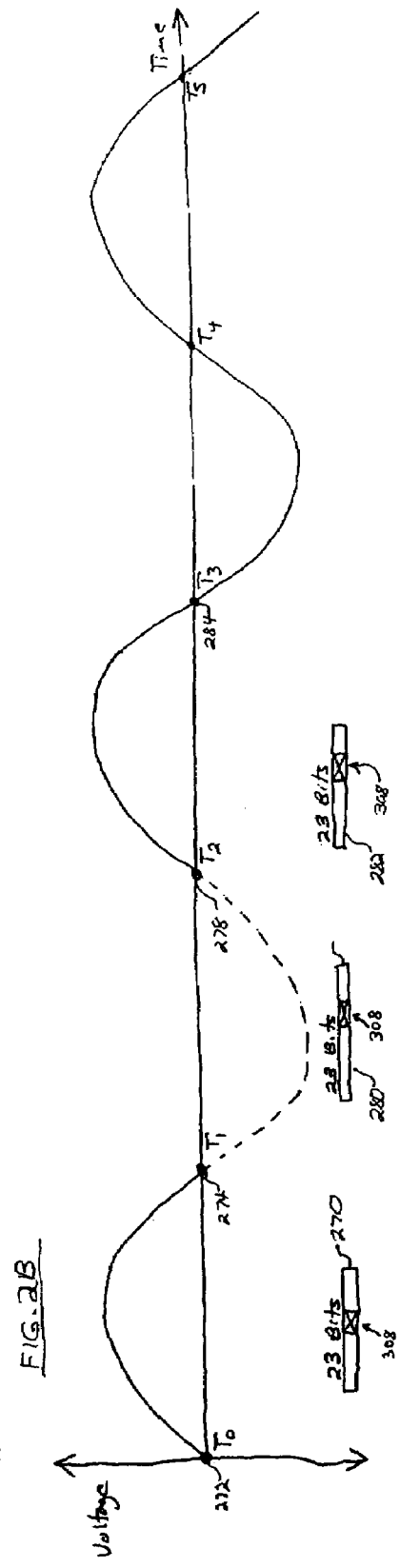
FIG. 2A
FIG. 2B

MODEL TRAIN WIRELESS BI-DIRECTIONAL COMMUNICATION PROTOCOL

BACKGROUND OF THE INVENTION

The present invention relates to data protocols, and in particular command protocols for model trains.

A variety of control systems are used to control model trains. In one system, the power to the track is increased, or decreased, to control the speed and direction of the train. Multiple trains can be controlled by providing different power levels to the different sections of the track having different trains.

In another type of control system, a coded signal is sent along the track, and addressed to the desired train, giving it a speed and direction. The train itself controls its speed by converting the AC voltage on the track into the desired DC motor voltage for the train according to the received instructions. The instructions can also tell the train to turn on or off its lights, horns, etc. U.S. Pat. Nos. 5,441,223 and 5,749,547 issued to Neil Young et al. show such a system.

FIG. 1A is a perspective drawing of an example layout of a conventional model train system allowing the one-way communication of signals from a base unit to a locomotive and other components.

A hand-held remote control unit 12 is used to transmit signals to a base unit 14 and to a power master unit 150 both of which are connected to train tracks 16. Base unit 14 receives power through an AC adapter 18. A separate transformer 20 is connected to track 16 to apply power to the tracks through power master unit 150. Power master unit 150 is used to control the delivery of power to the track 16 and also is used to superimpose DC control signals on the AC power signal upon request by command signals from the hand-held remote control unit 12.

Power master unit 150 modulates AC track power to the track 16 and also superimposes DC control signals on the track to control special effects and locomotive 24'. Locomotive 24' is, e.g., a standard Lionel locomotive powered by AC track power and receptive to DC control signals for, e.g., sound effects.

455 kHz transmitter 33 of base unit 14 is configured to transmit an outgoing RF signal between the track and earth ground, which generates an electromagnetic field indicated by lines 22 which propagates along the track. This field will pass through a locomotive 24 and will be received by a capacity antenna located inside the locomotive.

FIG. 1B is a simplified schematic drawing of the conventional system shown in FIG. 1A. FIG. 1B shows a cross-sectional view of locomotive 24, which may be, e.g., a standard locomotive retrofitted or designed to carry antenna 26. The signal will then be communicated from antenna 26 to 455 kHz receiver 37 of engine 24. Locomotive 26 further includes a processor 84 in communication with receiver 37 and configured to interpret the received signal.

Returning to FIG. 1A, receipt of control signals is not limited to moving elements of the train set. The electromagnetic field generated by base unit 14 will also propagate along a line 28 to a switch controller 30. Switch controller 30 also has a receiver in it, and will itself transmit control signals to various devices, such as the track switching module 32 or a moving flag 34.

The use of both base unit 14 and power master unit 150 allows operation and control of several types of locomotives on a single track layout. Locomotives 24 which have been retrofitted or designed to carry receiver 26 are receptive to control signals delivered via base unit 14. Standard locomotives 24' which have not been so retrofitted may be controlled using DC offset signals produced by power master unit 150.

The remote unit can transmit commands wirelessly to base unit 14, power master unit 150, accessories such as accessory 31, and could transmit directly to train engines instead of through the tracks. Such a transmission directly to the train engine could be used for newer engines with a wireless receiver, while older train engines would continue to receive commands through the tracks.

The communication of signals to moveable and stationary components of a model train as described above, offers a number of advantages. However, even more advantages would be conferred by the ability to both send and receive signals from these train set components.

One challenge to implementing such a bi-direction communication strategy is fitting such a scheme within the existing uni-directional communication framework. Specifically, in order to preserve the value and functionality of existing train sets, it is important for any newly-implemented communications protocol to be backwards compatible with the existing protocol.

There are, however, a number of potential obstacles to implementing such a backwards compatible, bi-directional communication protocol. One obstacle relates to the lack of space allocated for return communications.

FIG. 1C plots a waveform for the signal communicated to the locomotive using the existing Lionel Train Master command format. Specifically, the Lionel Train Master command format uses 23 bits to assemble a command. The 23 bits are grouped together as 4 bit nibbles (a nibble is half of an 8 bit byte) and are represented in hexadecimal (hex). The first four nibbles translate directly to the Train Master command set, instructing the train on speed, use of horns, smoke, lights, etc.

The fifth nibble is a unique number used to detect errors, an error code. The error code represents the addition of the first four nibbles without a carry. The following is an example of a Train Master Engine 1 horn command.

| 0000 | 0000 | 1001 | 1100 | 0101 | 111 |
|------|------|------|------|------|-----|
| 0    | 0    | 9    | C    | 5    | Trailer (always ones) |
|      |      |      |      |      | Engine 1 Horn |
| | command | | | error | |

The three trailing bits at the end of the message are not currently used to communicate data information. The first trailing bit is set to offset any DC bias imparted by the combination of bits in the command. The last two trailing bits are used to fill the time until the next command packet is received.

FIG. 1C shows that the existing Train Master system involves the continuous transmission of command signals, with each such signal communicating data and allowing synchronization between multiple recipients. Specifically, first command signal 100 is transmitted over the cycle $T_0$-$T_1$ between zero cross-over points 102 and 104. Error nibble 106 of first command signal 100 does not indicate a fault for this signal.

Second command signal 110 is transmitted over the cycle $T_1$-$T_2$ between zero cross-over points 104 and 108. Error nibble 116 of second command signal 110 also does not indicate a fault for this signal.

Third command signal 112 is transmitted over the cycle $T_3$-$T_4$ between zero cross-over points 108 and 122. Checksum bit 126 of third command signal 112 indicates a fault for this signal.

As shown in FIG. 1C, there is no provision for pausing this continuous transmission in order to allow the receiving unit to respond. Moreover, such a pause in transmission would disrupt synchronization between the model train elements established and maintained by continuous emission of the command signal by the base unit.

Another potential obstacle to implementation of a backwards-compatible bidirectional communication protocol is the limited number of available commands. Specifically, all commands of the current Train Master system command structure have been allocated to either designate a variety of commands, or to address different trains or other controlled devices on a train set. No new commands are thus available to allow for handshaking and other functions inherent in bidirectional communication protocols.

The National Model Railroad Association (NMRA) is currently in the process of developing a standard for bidirectional communication with model trains. Proposed standard RP-9.3.1, entitled "Decoder Transmission—Electrical", is incorporated herein by reference for all purposes. This proposed communication standard relies upon a cutout device to create a short interruption in the transmission of signals, within which a response signal may be initiated. While potentially effective, this approach offers some disadvantages, such as requiring installation of a filter on existing analog locomotives to prevent their operation from being adversely affected by the cut-out device.

U.S. Pat. No. 6,539,292 proposes an alternative bi-directional communications protocol for model trains, in which moving elements continuously transmit information. This approach offers the disadvantage of generation of multiple data signals that may interfere with each other and generate noise, which is already a problem in the model train environment. Also, this patent focuses upon communicating with two-rail model train systems, rather than other system types such as those utilizing three-rails.

Therefore, there is a need in the art for a protocol allowing bi-directional communication with model trains that exhibits low noise and which is backwards compatible with existing unidirectional protocols and with legacy analog locomotives.

BRIEF SUMMARY OF THE INVENTION

Embodiments in accordance with the present invention provide methods and apparatuses for implementing a bi-directional model train communications protocol compatible with existing uni-directional communications protocols. In one specific embodiment, the existing uni-directional Lionel Train Master command set is expanded utilizing the checksum error nibble to flag an alternative command signal format. This expanded command set is in turn utilized to transmit a command inquiry signal from the base unit to a specifically addressed element. The addressed element in turn transmits a response based upon the expanded command set. Older model railroad elements not configured to recognize the expanded command set, regard the command inquiry signal as a transmission error and are unaffected, and maintain their internal timing relative to the incoming command inquiry signal. Newer model railroad elements not specifically addressed by the command inquiry signal ignore the command and continue operation.

An embodiment of a method in accordance with the present invention for conducting bi-directional communication with a model vehicle, comprises, transmitting a command inquiry signal to the model vehicle from a control unit during a first communication period, and automatically pausing transmission by the control unit during the entirety of a second communication period immediately following the first communication period. The model vehicle transmits a response signal during the second communication period, and transmission is automatically resumed by the control unit at the conclusion of the second communication period.

An embodiment of a system in accordance with the present invention for interrogating a model vehicle, comprises, a control unit including a first receiver and a first transmitter in electrical communication with a model vehicle, the first transmitter configured to transmit a command inquiry signal during a first communication period, and configured to automatically pause transmission for an entirety of a second communication period immediately following the first communication period. The model vehicle includes an antenna in electrical communication with the control unit and configured to receive the command inquiry signal therefrom, a second receiver in configured to receive the command inquiry signal from the antenna, and a second transmitter configured to transmit a response signal to the antenna during the second communication period in reply to the command inquiry signal. The control unit is configured to recognize the response signal.

An embodiment of a bidirectional communications protocol in accordance with the present invention for communicating with a model vehicle, comprises, a command set belonging to a legacy uni-directional communication protocol, and a second command set extended from the first command set. The second command set comprises a command inquiry signal for transmission by a control element in communication with a model vehicle, and a response signal for transmission by the model vehicle in reply to the command inquiry signal.

For further understanding of the nature and advantages of the invention, reference should be made to the following description taken in conjunction with the accompanying drawings.

BRIEF DESCRIPTION OF THE DRAWINGS

FIG. 2A illustrates a simplified schematic view of an example of a model train system in accordance with the present invention having commands transmitted to and from a train engine.

FIG. 2B illustrates a waveform of a command and command inquiry signals transmitted and received in the model train system of FIG. 2A.

DETAILED DESCRIPTION OF THE INVENTION

Example Control System

Figure 1A:
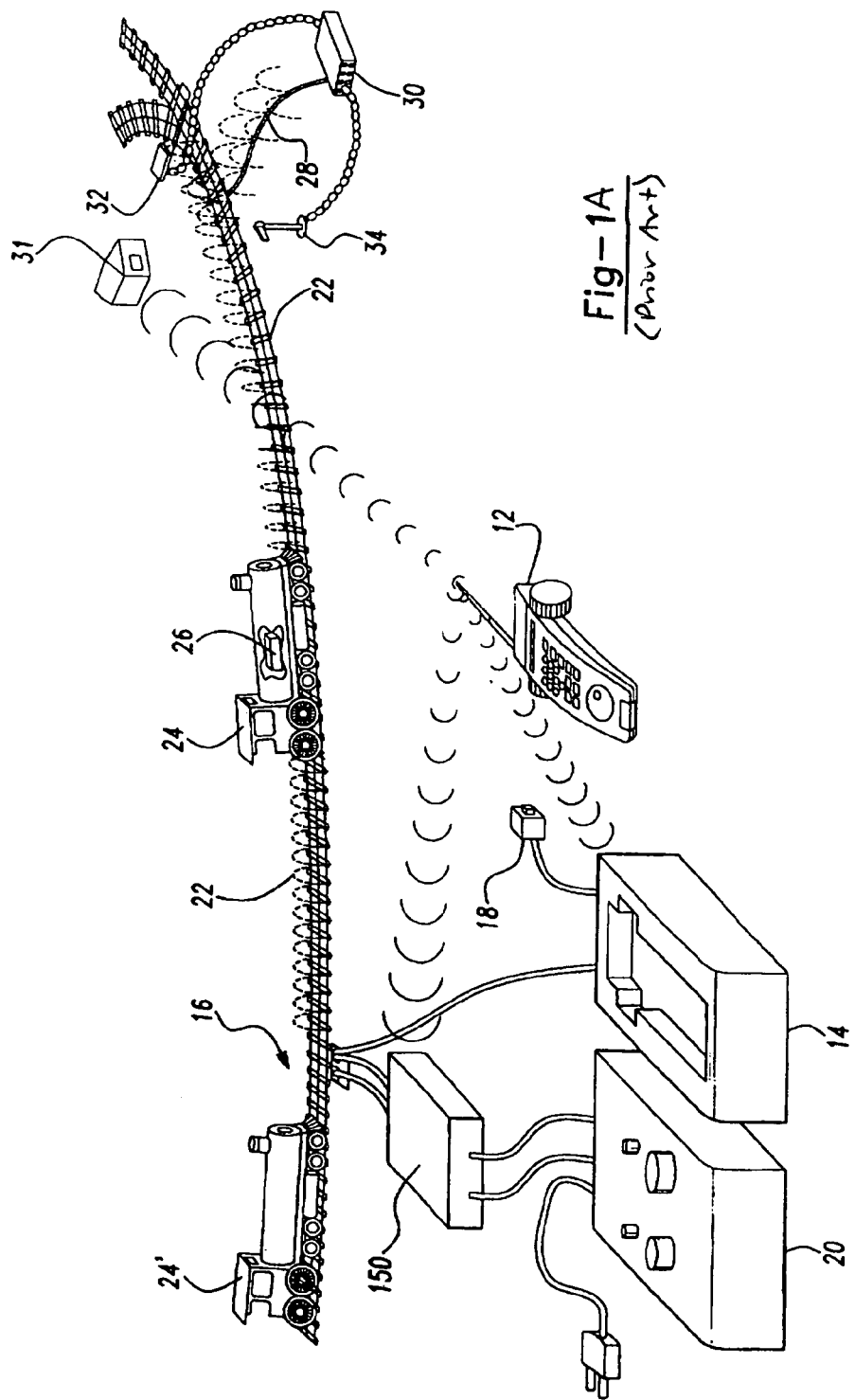
FIG. 1A illustrates a perspective view of an example of a model train system having commands transmitted to a train engine and accessories on the train layout.
Figure 1B:
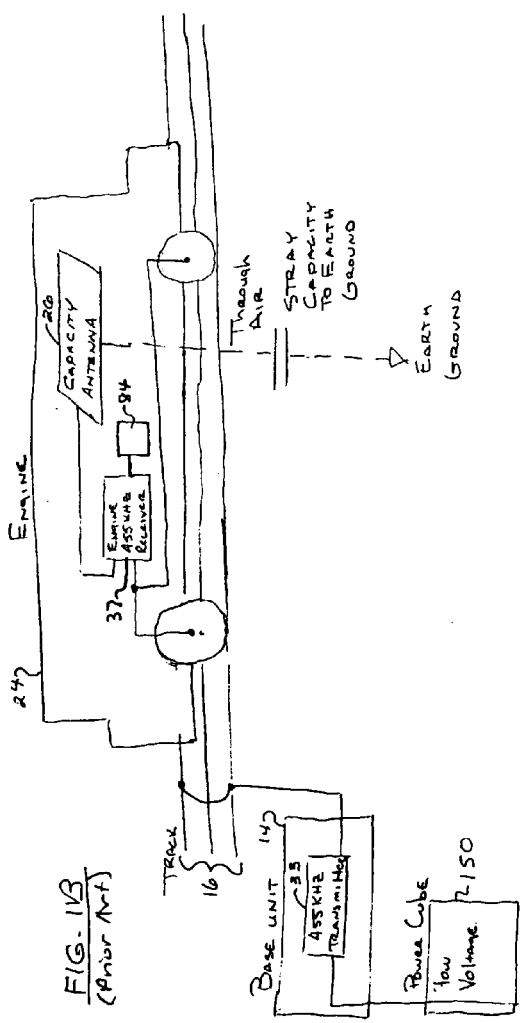
FIG. 1B illustrates a simplified schematic view of the model train system of FIG. 1A.
Figure 1C:
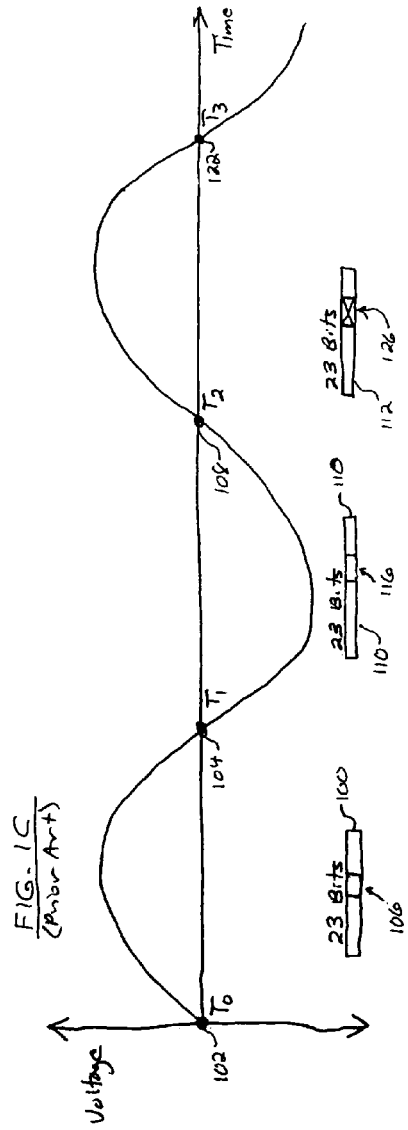
FIG. 1C illustrates a waveform of a command signal transmitted in the model train system of FIGS. 1A-B.

FIG. 2A illustrates a perspective view of an example of a model train system in accordance with the present invention, having commands transmitted to and from a train engine. The system of FIG. 2A is compatible with train set shown in perspective view in FIG. 1A.

System 200 of FIG. 2A features a number of elements allowing the locomotive and other track elements to return signals to base unit 214. Specifically, locomotive 224 includes 455 kHz transmitter 260 in electrical communication with antenna 226 through first transmit/receive element 231. Base unit 214 includes a 455 kHz receiver 252 in electrical communication with track 216 through second transmit/receive element 233.

Element 231 is configured to selectively allow communication of signals incoming to locomotive 226, to receiver 252, and to selectively allow communication of outgoing signals to antenna 226. Element 233 is configured to selectively allow communication of signals outgoing from base unit 214 to rails 216, and to selectively allow communication of incoming signals to receiver 252. In the embodiment shown in FIG. 2A, elements 231 and 233 comprise active switching devices whose state is controlled by respective processors 484 and 485. In an alternative embodiment, one or both of elements 231 and 233 may comprise an arrangement of circuit elements allowing one-way passage of current.

In one operational mode, first element 231 is configured by processor 484 to place antenna 226 in electrical communication with engine receiver 255, and second element 233 is configured by processor 485 to place base unit transmitter 257 in electrical communication with track 216. In this operational mode, base unit 214 can transmit signals to train 224.

In another operational mode, first element 231 is configured to place antenna 226 in electrical communication with engine transmitter 260, and second element 233 is configured to place base unit receiver 252 in electrical communication with track 216. In this operational mode, base unit 214 can receive signals transmitted by train 224.

Figure 2C:
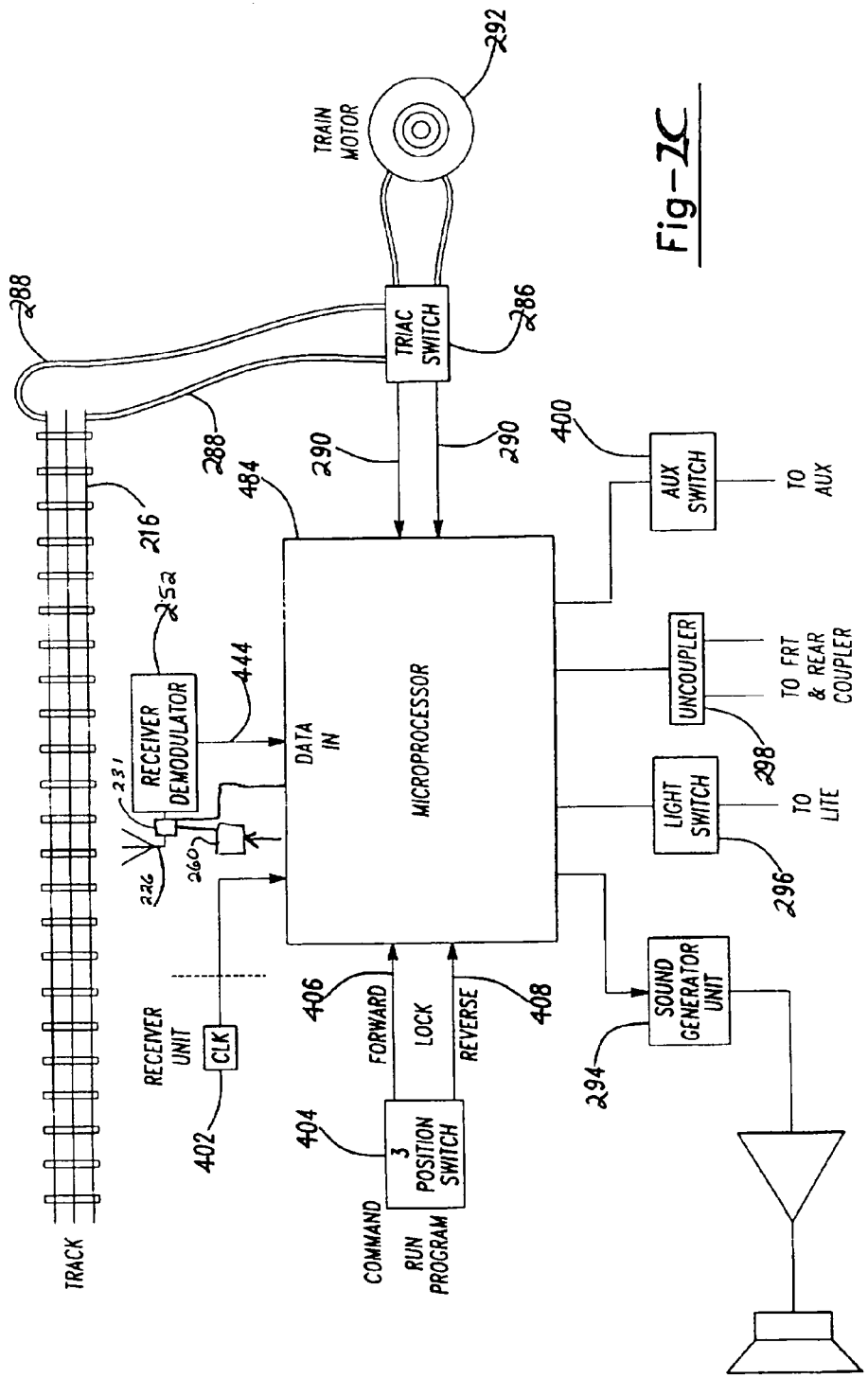
FIG. 2C is a diagram of an example of the circuitry inside a train engine for receiving such commands.

FIG. 2C is a block diagram of an example of the circuitry inside of a train 224 running on track 216. A receiver and demodulator circuit 252 picks up the electromagnetic field signals from antenna 226, and provides them to a data input of a microcontroller 484. The receiver can be an FM receiver chip and the microcontroller can be a microprocessor. The microprocessor controls a triac switching circuit 286. One side of the triac switches are connected to the train tracks through leads 288 which pick up power physically from the track. When activated by control signals from microcontroller 484 on lines 290, the triac switching circuit 286 will provide power to train motor 292, which moves the wheels of the train.

The microcontroller also has separate, dedicated output pins which can control a sound generator unit 294, a light switch 296, a coupler 298 and an auxiliary switch 400. The microcontroller is powered by an on-board clock 402.

A three position manual switch 404 is provided. In a first mode, the switch indicates on a line 406 that the train is to start in the forward direction. When in a second position, a signal on a line 408 indicates that the train is to start in the reverse direction. When the switch is in-between the two lines, in a "lock" mode, the microcontroller knows to start the train in the last direction it was in.

The same switch 404 can perform a second function. When a control command is received by the microcontroller, it knows to use the position of switch 404 to indicate either a "run" mode when the switch is in position 406, or a "program" mode when the switch is in the position on line 408.

In order to program an address into a train, the manual switch is moved into the program mode and the train is put on the track. The remote unit is then used to provide an address program command with a designated address for that train. This command is received by the receiver 226 and provided to microcontroller 484, which knows it should write into its memory that address as its designated address. Thereafter, in the run mode, the microcontroller will respond only to commands associated with that address.

One specific implementation for a bi-directional communication protocol compatible with an existing uni-directional communications protocol, is now described.

New Command Set

As previously described, one potential obstacle for implementing a bidirectional communication protocol that is backwards compatible with existing uni-directional communications protocols is the lack of availability of additional commands necessary for such bi-directional communication.

U.S. nonprovisional patent application Ser. No. 10/705,216 (the '216 application), filed Nov. 7, 2003, and entitled "Expanding Instruction Set Using Alternate Error Byte," is incorporated herein by reference. The '216 application describes approaches to expanding the number of available commands for the existing Lionel Train Master command structure.

Figure 3:
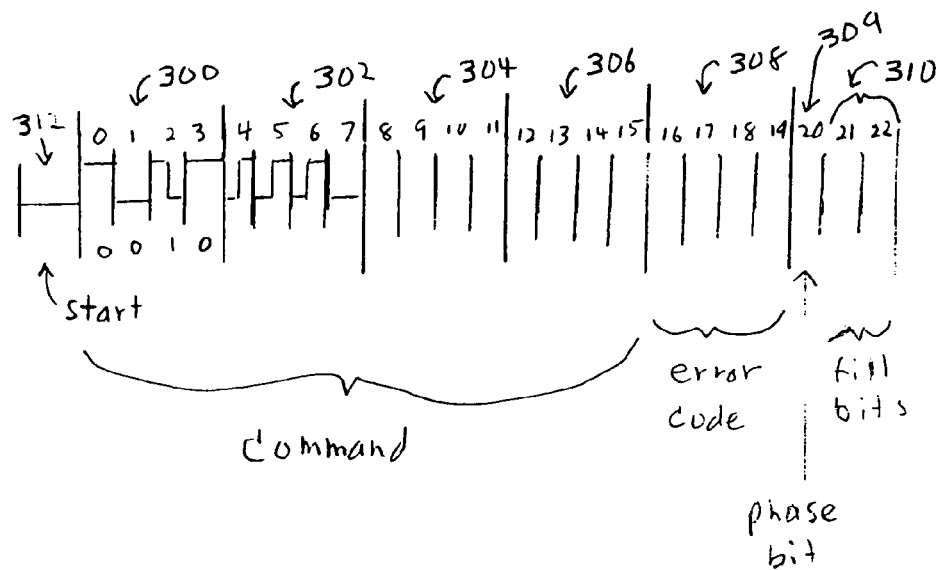
FIG. 3 is a diagram illustrating a command packet as modified by the present invention.

FIG. 3 is a diagram of a command packet illustrating an embodiment of the present invention. The command packet is the command packet used for the Lionel Train Master system. The packet contains four nibbles of data, nibbles 300, 302, 304 and 306. Each nibble contains four cells, with each cell storing a single bit. Also provided is a checksum, or error nibble 308. The error nibble is calculated by adding the values of nibbles 300, 302, 304 and 306. At the end of the packet are three trailer or filler bits, a phase bit 309 and two additional trailer bits 310. At the beginning of the packet is a start bit 312.

As can be seen, each of the command nibbles contains four cells, each with a bit of data. Looking at the first command byte 300, it is shown as encoding 0010. The 0 level is either high or low for the entire width of the cell. The protocol requires that the signal transition at each cell boundary. This transitioning helps ensure that the signal switches constantly to prevent a DC offset being imposed. As can be seen from the third cell in byte 300, a value of 1 is indicated by a transition in the middle of a cell. The start bit is distinguishable from the rest of the cells because it lasts one and one-half cell lengths at the same level, 0 level, thus indicating the new command packet is beginning.

Due to the clock timing used to generate the packet, there is a little extra time between command packets, which is filled by three filler or trailer bits 310. The last two bits are always a 1 in the existing Train Master protocol, while the bit in position or cell 30 is used for two purposes. The first is to offset any DC value generated by a particular combination of the command and error bytes by alternately setting cell 30 to a 0 or a 1 to compensate. The second function is to insure that the last transition bit time is smaller than 1 cell time. This insures proper start bit detection by the receivers.

The invention provides a method in which the command structure is expanded while maintaining full backwards compatibility. The solution is to send a command or message with a method of calculating the error nibble in a manner other than what is currently being used, allowing unique identification of an old and new command structure. The ideal method is to create a pattern that is the exact opposite of the current method. This allows the current command set to be doubled and is fully compatible with all old receivers. The addition to the structure allows for an additional 65,536 commands for the Lionel Train Master protocol.

New receivers would make two checks. The first using the old method and in addition checking the bit 310 for a value of 11—if it passes, then it is considered an old command. If the bits of 310 are 00, 01 or 10 the error nibble is complemented and a second check is made. If the second check passes, it is considered the new style message and is identified uniquely as one of the three extended command sets. In the case presented there are 16 possible error combinations. In the old method 1 out of 16 is correct. With the new system 2 out of 16 would be correct. This reduces the error detection capability by half but the complemented selection is the best out of the 16 possible for the second choice. By using the addition bits contained in 310, the command and error detection is not reduced but rather enhanced because of the introduction and inclusion of these two bits in the command and error interpretation. This is not a concern due to the serial stream transmission format used where individual bit errors are the concern.

The following change is introduced to double the current command set structure without changing bits 310.

| Old Method | | | | | | |
|---|---|---|---|---|---|---|
| 0000 | 0000 | 1001 | 1100 | 0101 | 1 11 | |
| 0 | 0 | 9 | C | 5 | | Trailer 310 (always ones) Engine 1 Horn |

| New Method | | | | | | |
|---|---|---|---|---|---|---|
| 0000 | 0000 | 1001 | 1100 | 1010 | 1 11 | |
| 0 | 0 | 9 | C | A | | Trailer 310 (always ones) New Command |

Second enhancement using trailer 210 bits to extend the command set and recover lost error code possibilities.

| Old Method | | | | | | |
|---|---|---|---|---|---|---|
| 0000 | 0000 | 1001 | 1100 | 0101 | 1 11 | Trailer 310 (always ones) Engine 1 Horn |

| New Method | | | | | | |
|---|---|---|---|---|---|---|
| 0000 | 0000 | 1001 | 1100 | 1010 | 1 00 | Trailer 310 (00) New command set 0 bits 310 X-ORed with inverted error nibble |
| 0000 | 0000 | 1001 | 1100 | 1011 | 0 01 | Trailer 310 (01) New command set 1 bits 310 X-ORed with inverted error nibble |
| 0000 | 0000 | 1001 | 1100 | 1000 | 0 10 | Trailer 310 (10) New command set 2 bits 310 X-ORed with inverted error nibble |

The above embodiment is only one example of the applicability of the present invention. Any method that relies on two unique error values for selection by using or comparing the first value to the second value could be used. This can be done, for example, by performing a math function such as adding, subtracting, logical ORing, logical ANDing, logical X-ORing or comparing and regenerating a value to the original calculation to create a second unique number. The generation of a second unique number is based and computed on the information received.

Figure 4:
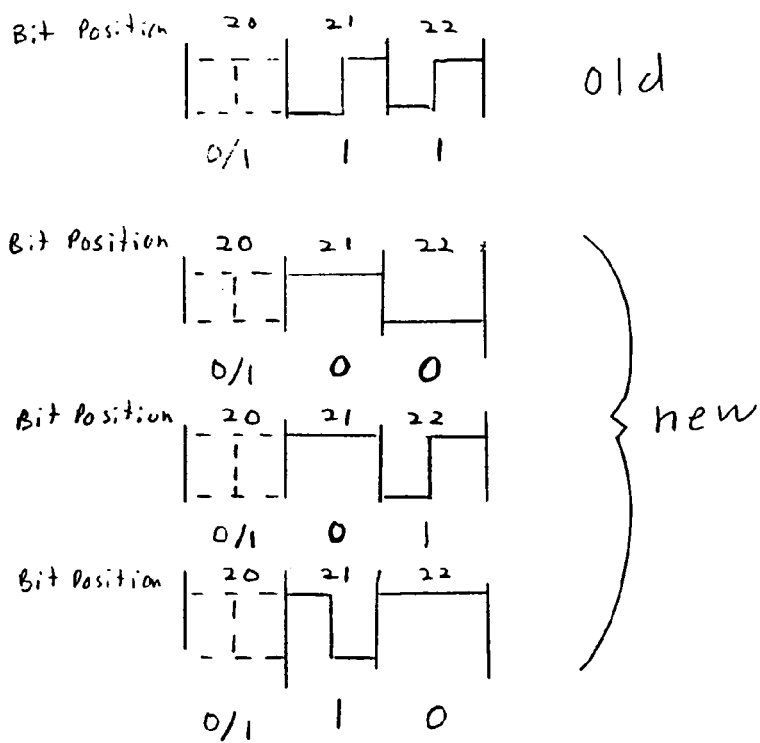
FIG. 4 is a diagram of alternate codings of the fill or trailer bits according to an embodiment of the invention.

Another aspect of the present invention utilizes the last three bit positions shown in FIG. 3 to extend the command set. As shown in FIG. 4, the old method in the Lionel protocol uses bits 21 and 22 to indicate a 1, with transitions in the middle of the cell. This fills up the space between command packets. Bit position 20 can be either a 0 or a 1, as needed to balance a command to provide either more positive or negative value to ensure that there is no DC offset.

The present invention adds three new combinations as illustrated, with the last two bits being either 00, 01 or 10. This means in the Lionel implementation that three additional sets of 65,536 commands will be added to the existing structure. These combinations can be used to separately expand the command set, using only the old error nibble, or could be combined with use of the new error nibble. Using these two bits creates additional bits to include in the calculation of the error nibble. The best way to calculate the new error nibble would be to use only the combinations that would provide the greatest differences in bit pattern from the original error nibble. The most preferred method would be to X-OR the two bits of the trailer with the error nibble, removing any combination that would have a difference less than three bits (the combination of 11 is not used in the X-ORed calculation; only 00, 01 and 10). Reserving this 11 combination provides an additional check between the old and new command set structure. X-ORing holds bit places and is preferred because it insures at least three bit differences between the original and new error nibble calculation. This along with reserving the 11 trailer bit combinations provides a method that can further distinguish between an error nibble in the old and new methods.

Bit position 20 is a phase bit used to control the ending waveform to insure the last cell width is less than one cell time and provides the best neutralization of the DC offset.

The old system had only one check on the receiver data, the checksum. The new protocol and receivers add additional checks on the old data method along with new checks described below.

Existing Check
    4 bit checksum type based in bit positions <16 19>

New Checks for Old TMCC
    Phase Bit Check bit position <20>
    Ending 11 check in bit positions <21 22>
    4 bit checksum type based in bit positions <16-19>
    Additional checks in extended protocol
    Phase bit check of entire message including bit positions 21 and 22
    Ending check of 00,01 or 10 in positions <21 22>
    Uses inverted checksum calculation in combination with bits 21 and 22 that are exclusive-ORed into the error calculation as described previously
    Repetition algorithm based on receiving two identical valid commands within 100 ms
    Phase bit check of entire message
    Transmission method of sending each command 9 times total, 3 bursts of 3 commands The new check of bit position 20 for old TMCC commands will be an additional way to detect an error, with the error either being in the command or the phase bit itself. This is done by the receiver of the command re-doing the calculation of what the phase bit should be to provide the desired DC offset compensation, and then determining if that is in fact its value received. An error in the phase bit could be a problem with the calculation on the transmission side, or interference in the transmission corrupting the phase bit, or the command therefore the phase bit 309 is calculated after the data and trailer results have been calculated. The phase bit 309 is then adjusted to the proper value as previously described.

The new checksum calculation will include the two fill bits, 21 and 22, by exclusive-ORing them into the check sum. The algorithm for the new checksum, in a preferred embodiment, is (1) adding the values of the four nibbles, (2) dropping the most significant bit, (3) inverting the resulting number, and (4) exclusive-ORing with bits 21 and 22 in bit positions <1 and 0> of the error nibble. Alternately, other algorithms could be used, such as exclusive-ORing or some other combination before or after the inversions, or some operation other than an inversion. Or, an entirely different algorithm could calculate a unique number directly from the command and fill bits.

Although one embodiment has been described above, the present invention can embodied in other specific ways without departing from the essential characteristics of the invention. For example, the error nibble could simply be a number calculated from the preceding digital field. And although a command with four nibbles of four bits each has been shown, other command sizes could be used. Also, different sizes of the unique number or error nibble could be used, such as 2, 3, 4, 6, 8, or any other number of bits. The error number could be a checksum, CRC, or any other error code, such as a Reed Solomon code, or some other code not used for error detection. The commands or other digital data could be provided for any type of system, not just model trains. The data need not be command, but could be simply messages or other digital data.

Bi-Directional Communication Protocol Utilizing New Command Set

The new command set described above can be used to implement a bi-directional communications protocol that is compatible with the existing uni-directional communications protocol. Specifically, the base unit can be configured to emit a command inquiry signal based upon the new command set.

0110 0100 1001 1100 1010 0 01 Sample Command Inquiry Signal

The status of this specific command inquiry signal as belonging to the expanded command set is revealed by the inverted error nibble and by the zero state of two of the trailing bits. Another item of information represented in the data portion of this signal is the specific identity of the element to which it is addressed. Still another item of information represented in the data portion of the signal is the type of command represented (i.e. a command inquiry, to which the addressed element is expected to respond). Upon issuance of the inquiry command, the base station is programmed to halt transmission of commands for the immediately subsequent communications cycle, in order to allow transmission of the expected response.

Model train components of the older style not configured to engage in bi-directional communication, will simply regard the command inquiry as a single faulty transmission based upon the content of the error detection nibble. The operation of these old-style train components will be otherwise unaffected by transmission of the signal.

Model train components of the newer style configured to engage in bi-directional communication, will recognize the transmitted command as belonging to the expanded command set. Such components not specifically addressed by the command inquiry signal will ignore the signal and continue uninterrupted operation.

Model train components specifically addressed by the command inquiry will recognize the signal type and the need to provide a response. The addressed component will transmit a response to the base unit and to other elements of the train set, within the immediately subsequent communication cycle.

0110 0010 1001 1100 1010 0 01 Sample Response Signal

The status of this specific response signal as belonging to the expanded command set is revealed by the inverted error nibble and by the zero state of two of the trailing bits. Another item of information represented in the data portion of the response signal is the specific identity of the responding element. Still another item of information represented in the data portion of the response signal is the type of signal it represents (i.e. a response to a previous command inquiry). The base unit receives and recognizes this response, and is thereafter free to resume transmission of command signals.

In the event that no model train component responds to the command inquiry, the base unit is programmed to affirmatively resume and emit a no-operation signal for the following two cycles, thereby synchronizing the base and the elements of the train set. At the conclusion of transmission of two such consecutive no-operation signals, the base unit resumes transmission of command/command inquiry signals.

FIG. 2B illustrates a waveform of a command and command inquiry signals transmitted and received in the model train system of FIGS. 2A-B. Specifically, first command 270 is transmitted from the base unit over the cycle $T_0$-$T_1$ between zero cross-over points 272 and 274. Error nibble 308 of first command signal 270 indicates a fault to legacy receivers for this signal and is thus examined by new receivers to see if it is recognizable as a command inquiry belonging to the expanded claim set. Legacy model train elements simply recognize a faulty communication for this cycle, and their ongoing operation is unaffected thereby.

The base unit is silent over the cycle $T_1$-$T_2$ between zero cross-over points 274 and 278. During this period, the relevant addressed element transmits response signal 280. In the event the addressed element does not receive the command inquiry transmitted in the first cycle, no signal at all would be transmitted during the ensuing cycle $T_1$-$T_2$.

To legacy train set elements, error nibble 308 of response signal 280 may be perceived as a communication error, with operation of these legacy elements being otherwise unaffected. The presence of this response signal does, however, serve to resume synchronization after a gap of only one communications period.

To train set elements configured to recognize the expanded command set, error nibble 308 of response signal 280 indicates a code permitting the replying element to express information hitherto unavailable under the original command set. Examples of information contained within a response signal include, but are not limited to, identity, location, direction, speed, and health of a locomotive, connectivity between a locomotive and specific rail cars, and the status of an element, for example whether a stationary crossing gate is in the down or up position.

In the event the base unit did in fact receive the response signal transmitted during the second communications cycle, the base unit is configured to resume communication of a command signal 282 during the third communications cycle T₂-T₃ between zero cross-over points 278 and 284. This resumed command signal 282 may be formatted per the original command set, or per the extended communications set as indicated by at least the state of the error nibble.

New receivers would also have the capability to receive transmission of responses returned to the base from other elements, allow these response commands to govern operation of an element without requiring direct, repeated transmission from the base. Thus under certain conditions, bi-directional communication implemented by embodiments of the present invention allows direct communication of information between train elements, without requiring the information to originate from the base unit.

In the event that the base unit did not receive any response during the second cycle, the base unit is programmed to transmit a no-operation command signal for both the third communication cycle, and a subsequent fourth cycle occurring between T₃-T₄. This no-operation signal is a member of the original command set, and thus its error nibble would not indicate a fault. Ongoing transmission of the no-operation signal serves to maintain synchronization between train set elements, such that the longest possible period of non-transmission is the single period following transmission of the command inquiry.

Assuming the worst-case scenario where no response is received after issuance of every command inquiry signal, communication utilizing bidirectional communications protocol operates in blocks of four consecutive communications cycles (command inquiry/pause/no-op/no-op). In a model train system operating at the U.S. standard frequency of 60 Hz, the above bidirectional communications protocol allows communication of thirty command inquiry signals per second. In a model train system operating at a frequency of 50 Hz (the European standard), twenty-five command inquiry signals per second may be communicated. Either case provides sufficient capacity for even the most complex model train layouts.

Although one embodiment has been described above, the present invention can embodied in other specific ways without departing from the essential characteristics of the invention. For example, rather than indicating formatting of the extended command set by the error nibble, in alternative embodiments the existence of a member of the extended command set may be indicated by variation of the trailing bits, as described above.

While the specific embodiment described above relates to transmitting bi-directional communications signals to a model vehicle from a base unit having a fixed location, this is not required by the present invention. Alternative embodiments may establish bidirectional communications through a portable control unit, and remain within the scope of the present invention.

And while the specific embodiment described above relates to transmitting bi-directional communications signals along a track, this is not required by the present invention. Alternative embodiments may establish bidirectional communications through command inquiry and response signals transmitted over a wireless communications medium, and remain within the scope of the present invention.

Moreover, while the specific embodiment described above relates to controlling model trains, this is not required by the present invention. In accordance with alternative embodiments, model automobiles such as slot cars could also be controlled utilizing methods and apparatuses in accordance with the present invention.

Accordingly, the foregoing description is intended to be illustrative, but not limiting, of the scope of the invention which is set forth in the following claims.

What is claimed is:

1. A method of conducting bi-directional communication with a model vehicle utilizing a bi-directional communication protocol derived from an existing uni-directional communication protocol, the method comprising:
   transmitting a command inquiry signal to the model vehicle from a control unit during a first communication period;
   automatically pausing transmission by the control unit during the entirety of a second communication period immediately following the first communication period; and
   automatically resuming transmission by the control unit at the conclusion of the second communication period;
   wherein the model vehicle is configured to transmit a response signal to the command inquiry signal during the second communication period, and a legacy model vehicle, which is configured to interpret only the existing uni-directional communication protocol, is configured to interpret the command inquiry signal as a communication error.

2. The method of claim 1, wherein where the control unit automatically transmits a no operation signal for two consecutive communication periods following the second communication period if the base station fails to receive the response signal.

3. The method of claim 1 wherein the bi-directional communication protocol is derived by varying a state of an error detection code of the uni-directional communication protocol.

4. The method of claim 3, wherein the error detection code comprises four bits of a twenty-three bit signal packet.

5. The method of claim 1, wherein the command inquiry signal includes address information specific to particular model vehicle, and the response signal also includes the address information.

6. The method of claim 1, wherein the response signal includes information relating to at least one of the location, speed, direction of movement, identity, and health of the model vehicle.

7. The method of claim 1, further comprising receiving the command inquiry signal on an antenna of a model train locomotive.

8. A method of conducting bi-directional communication with a model vehicle, the method comprising:
   transmitting a command inquiry signal to the model vehicle from a control unit during a first communication period;
   automatically pausing transmission by the control unit during the entirety of a second communication period immediately following the first communication period;
   causing the model vehicle to transmit a response signal during the second communication period; and
   automatically resuming transmission by the control unit at the conclusion of the second communication period;
   wherein the command inquiry signal and the response signal are transmitted utilizing a bi-directional communication protocol adapted from an existing uni-directional communication protocol and the bi-directional communication protocol is adapted by varying a state of a space-filling code of the uni-directional communication protocol.

9. The method of claim 8, wherein the space filling code comprises at least one of three trailing bits of a twenty-three bit signal packet.

10. A system for interrogating a model vehicle and a legacy model vehicle, the system comprising:
a control unit including,
a first receiver; and
a first transmitter in electrical communication with a model vehicle, the first transmitter configured to transmit a command inquiry signal during a first communication period, and configured to automatically pause transmission for an entirety of a second communication period immediately following the first communication period;
a model vehicle including,
an antenna in electrical communication with the control unit and configured to receive the command inquiry signal therefrom;
a second receiver configured to receive the command inquiry signal from the antenna; and
a second transmitter configured to transmit a response signal to the antenna during the second communication period in reply to the command inquiry signal, wherein the control unit is configured to recognize the response signal; and
a legacy model vehicle including,
a second antenna in electrical communication with the control unit and configured to receive the command inquiry signal therefrom; and
a third receiver configured to receive the command inquiry signal from the second antenna;
wherein the legacy model vehicle is configured to interpret the command inquiry signal as a communication error, and not as a signal that requires a response.

11. The system of claim 10 wherein:
the control unit further comprises a first element configured in a first state to place the first transmitter in electrical communication with the track to transmit the command inquiry signal, and configured in a second state to place the first receiver in electrical communication with the track to receive the response signal; and
the model vehicle further comprises a second element configured in a first state to place the second receiver in electrical communication with the antenna to receive the command inquiry signal, and configured in a second state to place the second transmitter in electrical communication with the antenna to transmit the response signal.

12. The system of claim 11, wherein the at least one of the first and second elements comprises an active switch controlled by a processor.

13. The system of claim 10, wherein the first receiver and the first transmitter are in wired communication with a model railroad track, and the antenna is positioned on a model railroad locomotive.

14. The system of claim 10, wherein the model vehicle comprises a remote-control vehicle, the first receiver and the first transmitter are in wireless communication with the model vehicle, and the antenna is positioned within the model vehicle.

15. A system for interrogating a model vehicle, the system comprising:
a control unit including,
a first receiver;
a first transmitter in electrical communication with a model vehicle, the first transmitter configured to transmit a command inquiry signal during a first communication period, and configured to automatically pause transmission for an entirety of a second communication period immediately following the first communication period; and
a model vehicle including,
an antenna in electrical communication with the control unit and configured to receive the command inquiry signal therefrom;
a second receiver in configured to receive the command inquiry signal from the antenna;
a second transmitter configured to transmit a response signal to the antenna during the second communication period in reply to the command inquiry signal, wherein the control unit is configured to recognize the response signal; and
a stationary track element including,
a second antenna in wireless communication with the track;
a third receiver in configured to receive the command inquiry signal from the second antenna; and
a third transmitter configured to transmit a third signal to the second antenna in response to the command inquiry signal, wherein at least one of the base unit and the model vehicle are configured to receive and recognize the third signal as returned by the stationary track element.

16. A system for interrogating a model vehicle and a legacy model vehicle, the system comprising: at least one of a model vehicle and a legacy model vehicle; and a control element in communication with the at least one of the model vehicle and the legacy model vehicle, the control element comprising: a transmitter in communication with the at least one of the model vehicle and the legacy model vehicle, the transmitter being configured to transmit:
a first command set belonging to a legacy uni-directional communication protocol; and
a second command set extended from the first command set and comprising a command inquiry signal command inquiry signal, and a receiver in communication with the at least one of the model vehicle and the legacy model vehicle, the receiver being configured to receive a response signal from the at least one of the model vehicle and the legacy model vehicle in reply to the command inquiry signal
wherein the legacy model vehicle, which is configured to interpret the legacy uni-directional communication protocol, is configured to interpret the command inquiry signal as a communication error.

17. The system of claim 16, wherein the command inquiry signal and the response signal comprise a twenty-three bit signal packet.

18. The system of claim 17, wherein second command set includes error detection information recognizable to indicate the second command set.

19. The system of claim 17, wherein the second command set includes space-filling information recognizable to indicate the second command set.

* * * * *